BERNARD A. PEARSON
INVENTOR.

BY
Seed & Berry
ATTORNEYS

Sept. 20, 1966  B. A. PEARSON  3,273,882
SHEET COLLATING DEVICE
Filed May 23, 1963  12 Sheets-Sheet 2

INVENTOR.
BERNARD A. PEARSON
BY
*Seed & Berry*
ATTORNEYS

Sept. 20, 1966 B. A. PEARSON 3,273,882
SHEET COLLATING DEVICE
Filed May 23, 1963 12 Sheets-Sheet 3

INVENTOR.
BERNARD A. PEARSON
BY
*Seed & Berry*
ATTORNEYS.

Sept. 20, 1966     B. A. PEARSON     3,273,882
SHEET COLLATING DEVICE
Filed May 23, 1963     12 Sheets-Sheet 7
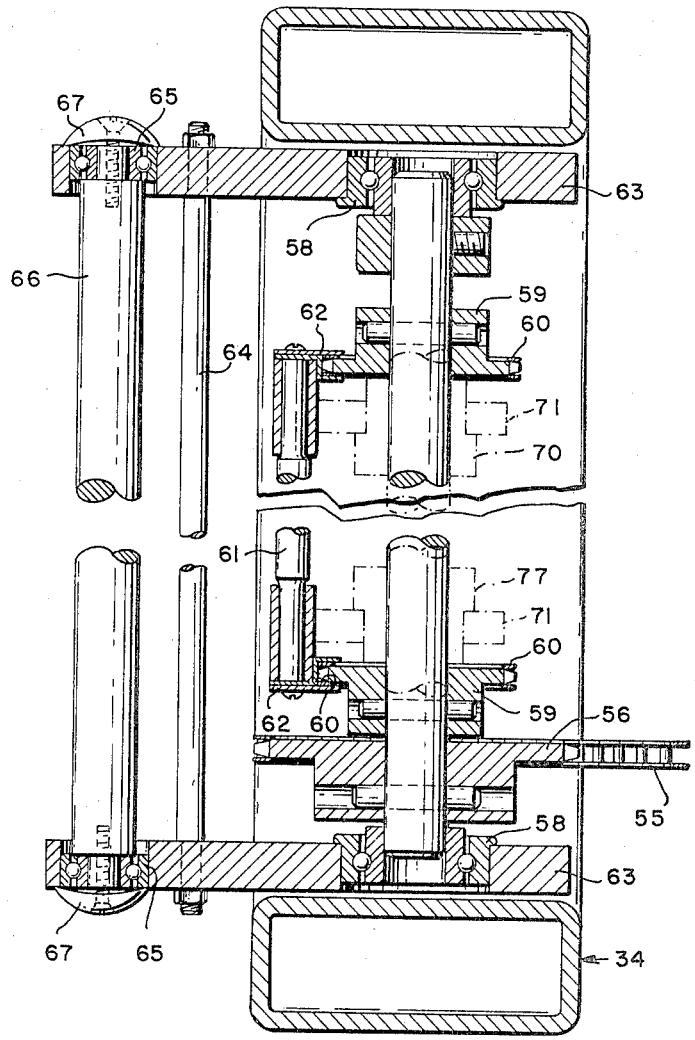
*Fig. 8*
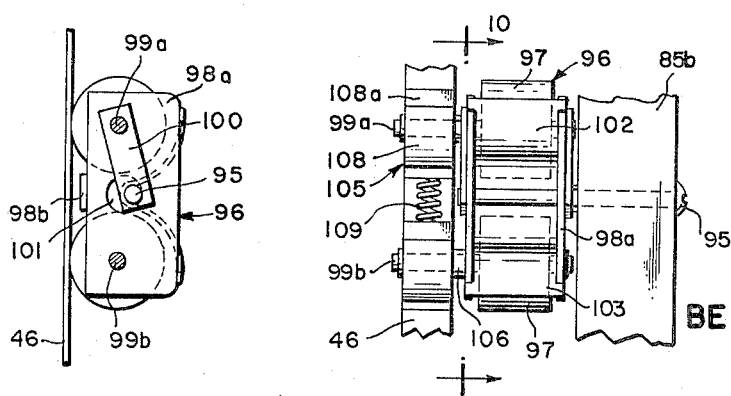
*Fig. 9*
*Fig. 10*
BERNARD A. PEARSON
*INVENTOR.*
BY
Seed & Berry
ATTORNEYS

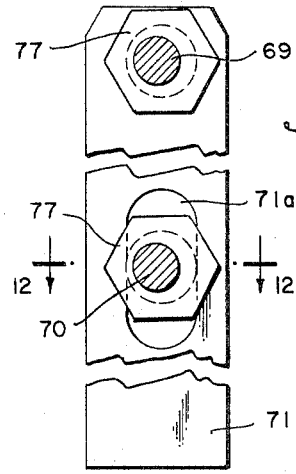
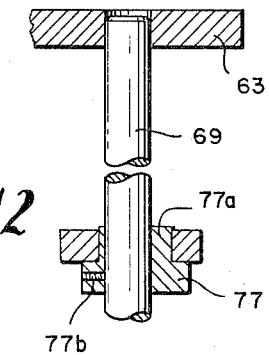
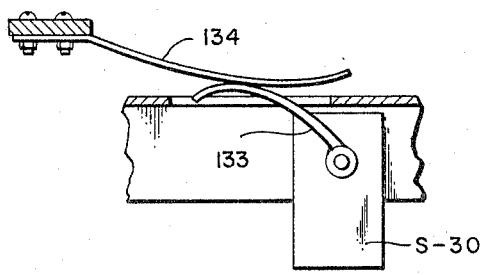
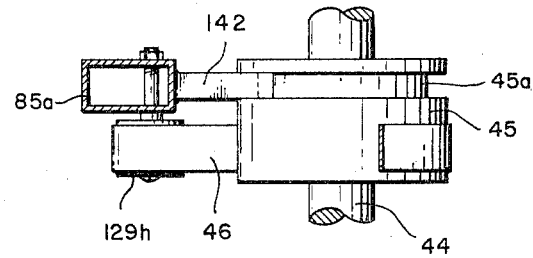
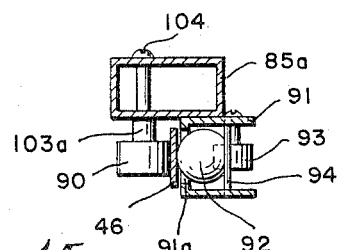
BERNARD A. PEARSON
INVENTOR.
BY Seed & Berry
ATTORNEYS Sept. 20, 1966  B. A. PEARSON  3,273,882
SHEET COLLATING DEVICE
Filed May 23, 1963  12 Sheets-Sheet 9

BERNARD A. PEARSON
INVENTOR.

BY Seed & Berry
ATTORNEYS

Sept. 20, 1966    B. A. PEARSON    3,273,882
SHEET COLLATING DEVICE
Filed May 23, 1963    12 Sheets-Sheet 10
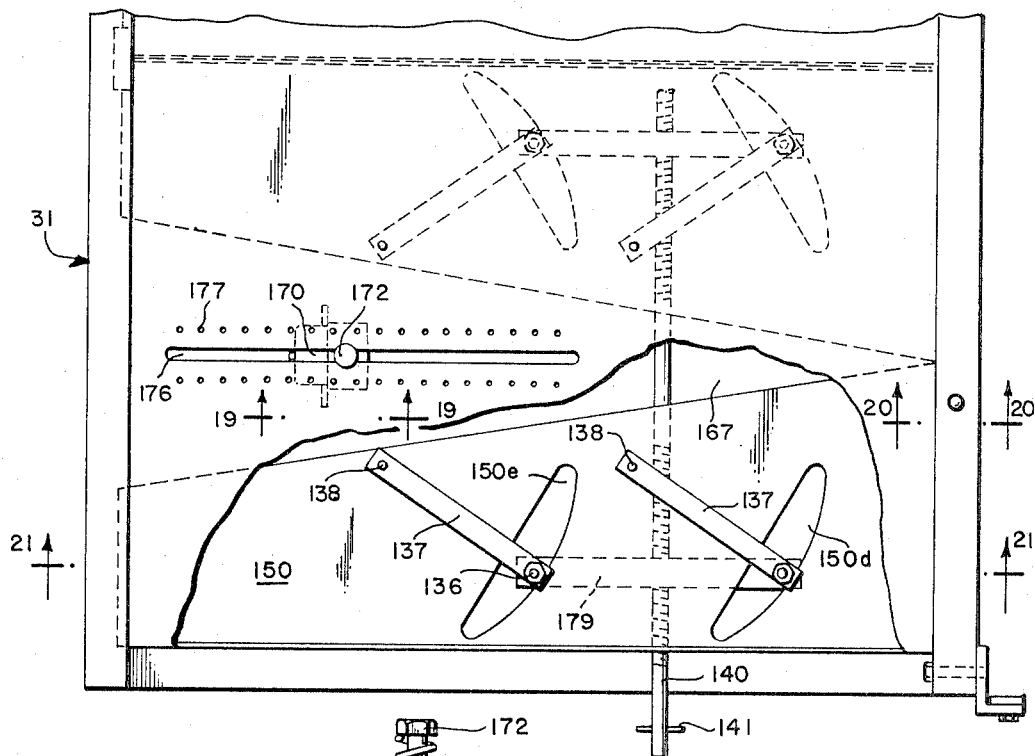
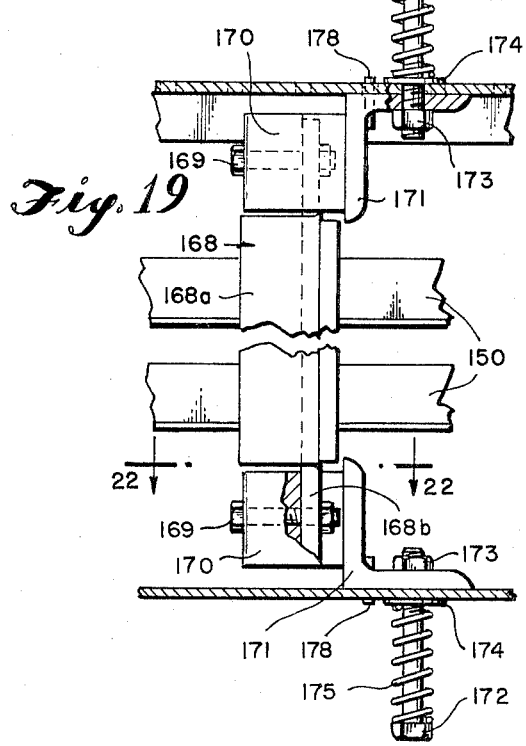
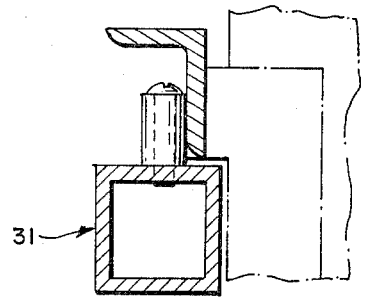
BERNARD A. PEARSON
INVENTOR.
BY Seed & Berry
ATTORNEYS

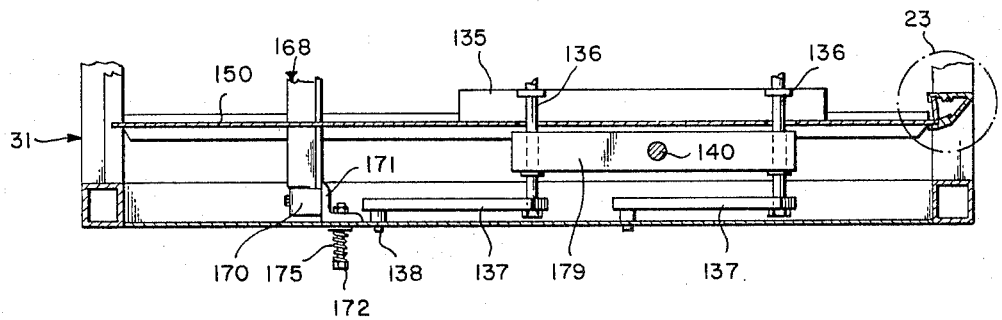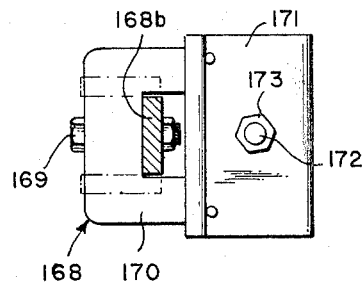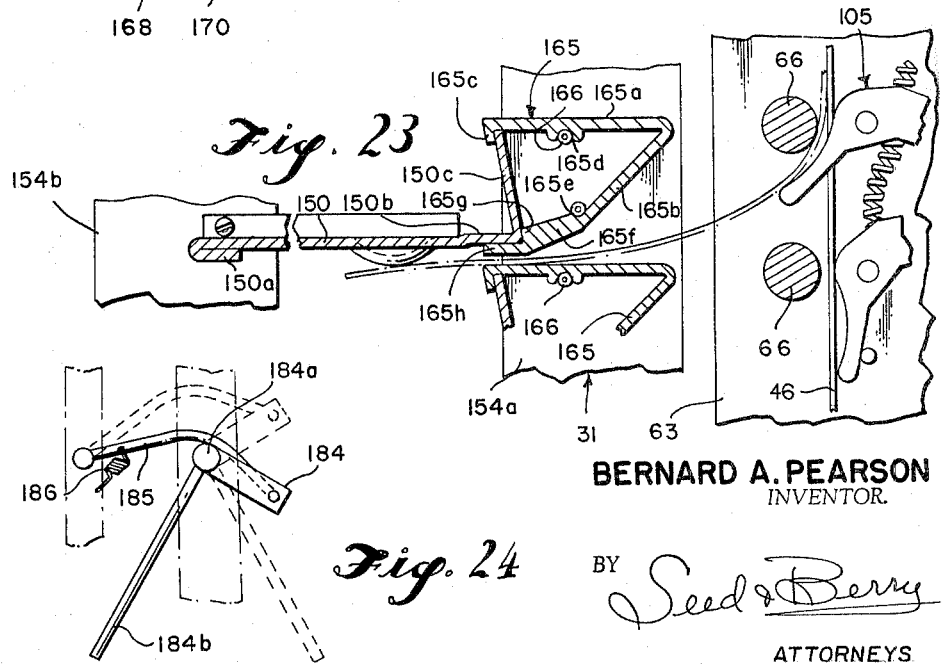

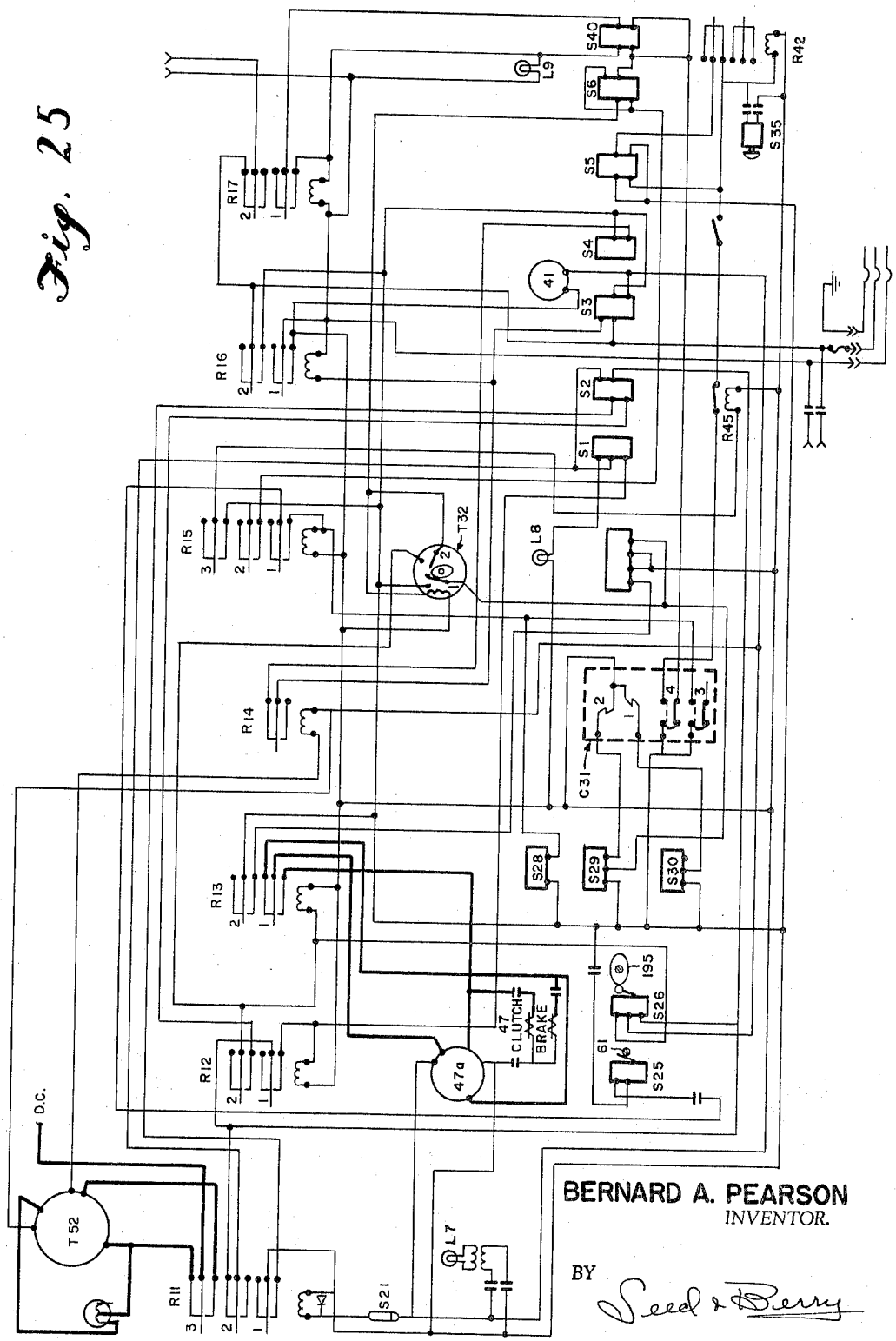

United States Patent Office 3,273,882
Patented Sept. 20, 1966

3,273,882
SHEET COLLATING DEVICE
Bernard A. Pearson, Seattle, Wash., assignor to Norfin, Inc., Seattle, Wash., a corporation of Washington
Filed May 23, 1963, Ser. No. 282,692
15 Claims. (Cl. 270—58)

The present invention relates to a collator of the type which accepts sheets from a printer, processing machine, feeder, or by hand, one sheet at a time, in multiple-sheet increments arranged in reverse order of the pages of the desired book or other document, and sorts the sheets into multiple copies of the document in individual cubicles ready for binding or other handling.

The invention aims to provide such a collator which will handle a wide range of sizes of sheets and weights of paper, and will handle sheets which are perforated or folded.

Another object is to provide a collator which is compact and mobile, and can be easily adjusted.

A further object is to provide a collator which performs its sorting function quickly and accurately, requires a minimum of set-up time and skill to prepare for a sorting run, and has a fast recycle time between run increments (between different sheets).

Still other objects are to provide a collator in which the sorting runs are automatic or can be controlled manually, which stops automatically if there is a sorting malfunction, and whose controls make it virtually impossible to short a page in one of the collated documents.

In addition, the invention aims to provide a collator having a portable receiver containing the cubicles in which the sorted sheets are delivered, and which has provision for neat stacking of the collated documents and quick adjustment for various sizes of sheets. Further regarding the collator receiver, the invention also aims to give ease of unloading the collated documents, and to make it possible to store one or more sets of collated documents in the receiver while another document is being collated.

The invention also aims to provide a collator which can handle sheets directly from a press without danger of smearing fresh ink while performing its sorting function.

Other objects and advantages in view will appear and be understood in the following description and claims, the invention consisting in the novel construction and in the adaptation and combination of parts hereinafter described and claimed.

In the accompanying drawings:

FIG. 8 is a horizontal cross-sectional view on an enlarged scale taken on line 8—8 of FIG. 6.

FIG. 9 is a front elevational view on an enlarged scale taken on line 9—9 of FIG. 6.

FIG. 10 is a side elevational view of the buggy taken on line 10—10 of FIG. 9.

FIG. 11 is a detail vertical cross-sectional view showing one means of adjusting the tripping bar carrier.

FIG. 12 is a horizontal cross-sectional view taken on line 12—12 of FIG. 11.

FIG. 13 is a horizontal cross-sectional view on an enlarged scale taken on line 13—13 of FIG. 6.

FIG. 14 is a vertical cross-sectional view on an enlarged scale taken on line 14—14 of FIG. 7.

FIG. 15 is a horizontal cross-sectional view on an enlarged scale taken on line 15—15 of FIG. 5.

FIG. 18 is a fragmentary plan view with a cutaway portion to illustrate the means of adjusting the shelves of the receiver to different size papers.

FIG. 19 is a vertical cross-sectional view taken on line 19—19 of FIG. 18.

FIG. 20 is a vertical cross-sectional view taken on line 20—20 of FIG. 18.

FIG. 21 is a vertical cross-sectional view taken on line 21—21 of FIG. 18.

FIG. 22 is a horizontal cross-sectional view taken on line 22—22 of FIG. 19.

FIG. 23 is a detail view taken as indicated by circle 23 in FIG. 21.

FIG. 24 is a detail plan view of the toggle mechanism for pulling the carriage forward.

FIG. 25 is a schematic of the collator control system.

Figure 1:
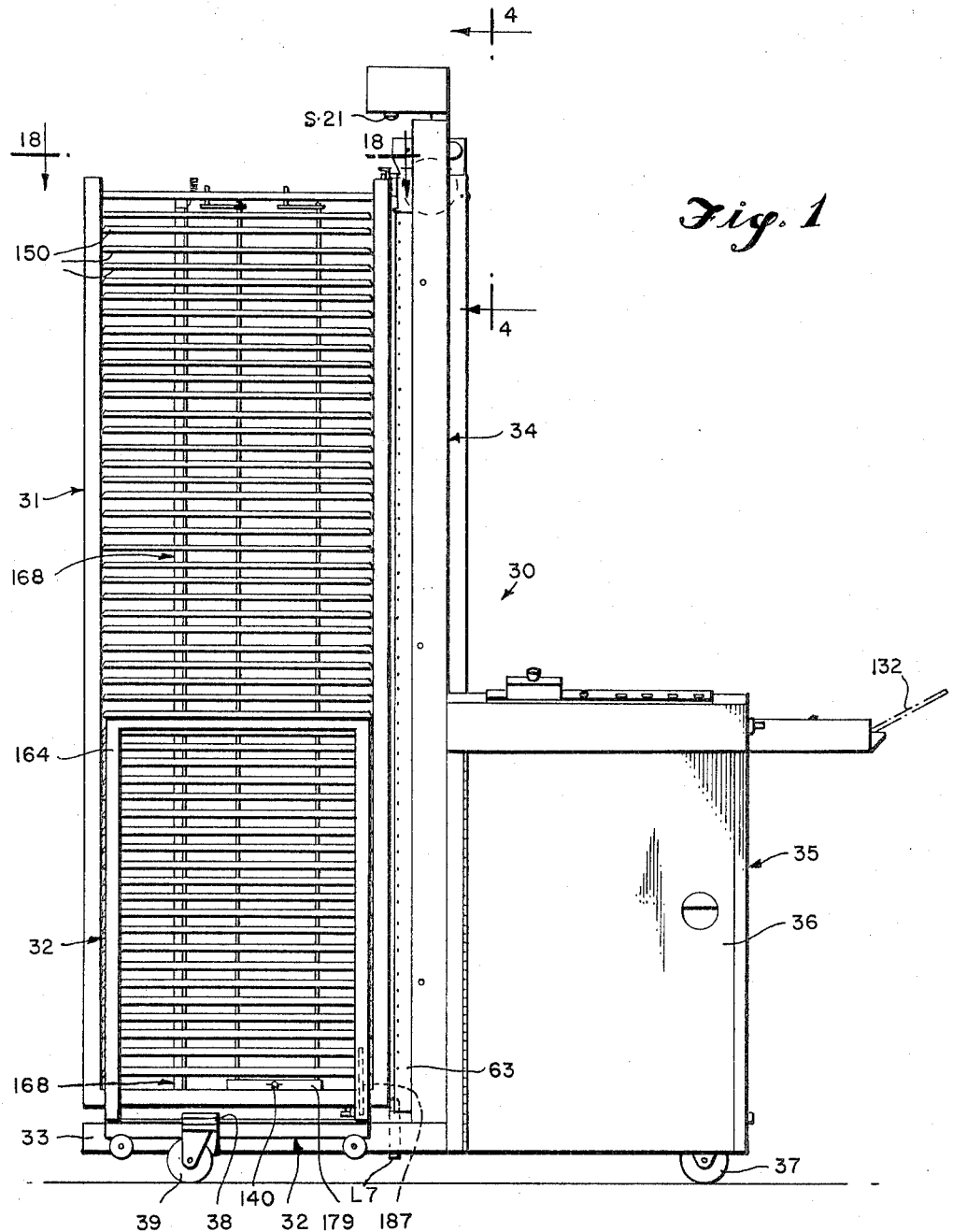
FIG. 1 is a side elevational view of the invention with the receiver in position.
Figure 2:
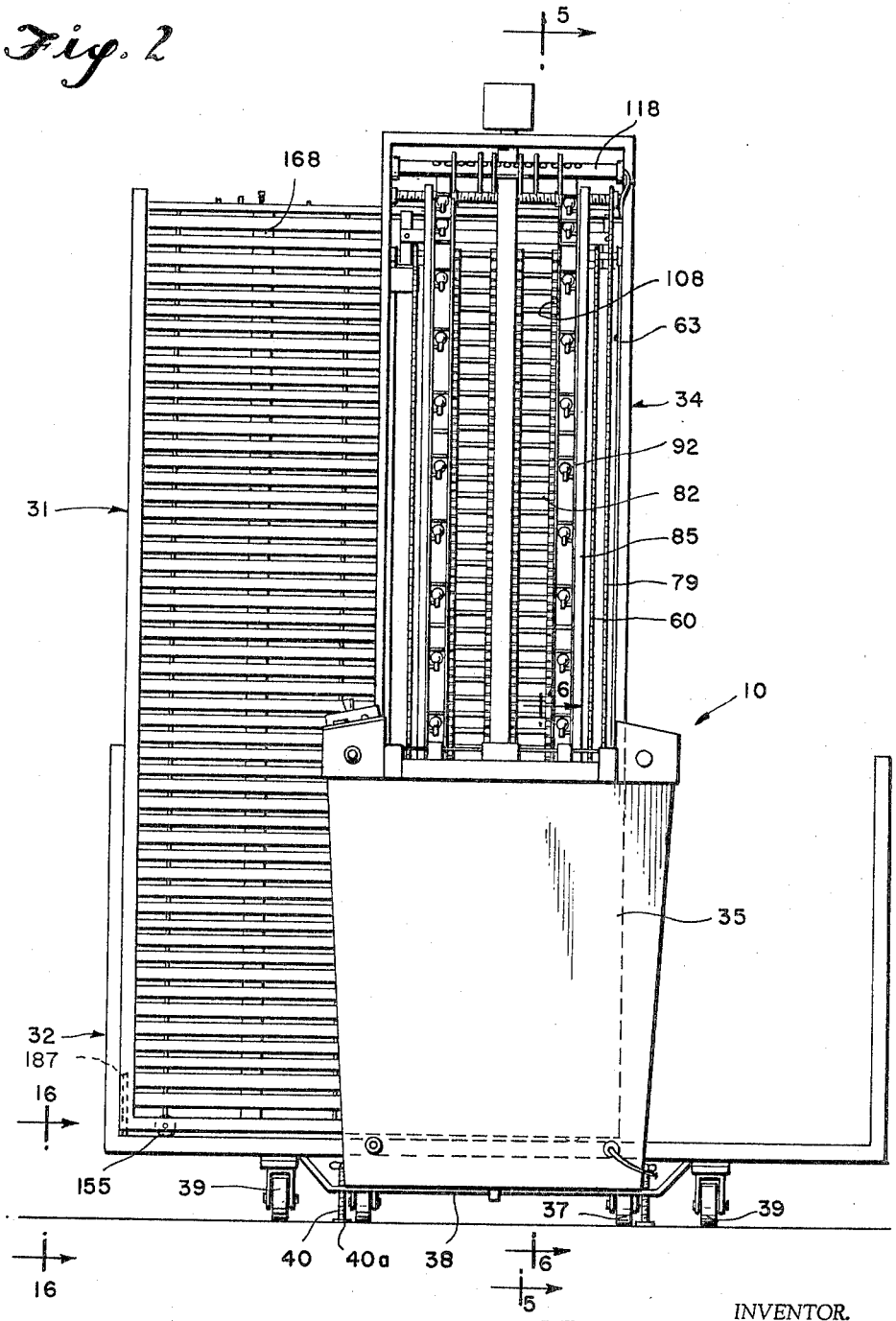
FIG. 2 is a front elevation view of the collator.
Figure 3:
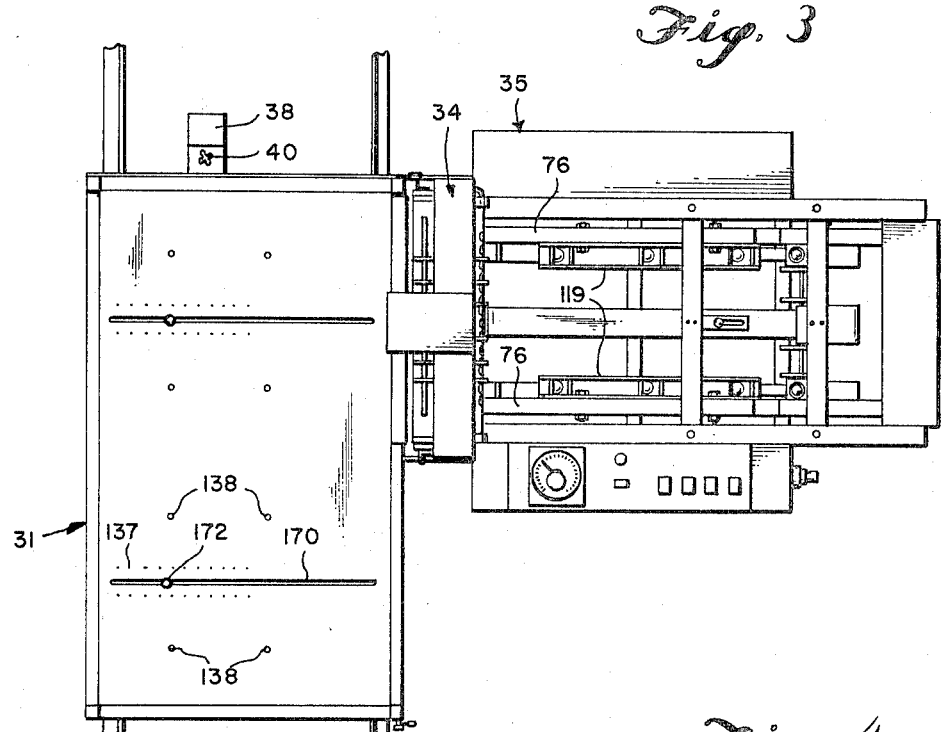
FIG. 3 is a plan view thereof.

Referring now to FIGS. 1 and 2 of the drawings, in general the collator of the present invention comprises a distributor 30 operating in repeating cycles, and an upright receiver 31 mounted on a carriage 32 at the rear of the distributor and having one or more vertical columns of shelves or bins for storage of collated sheets of paper or other suitable material delivered thereto in proper order by the distributor. These shelves are arranged to be fed from the front by the distributor and manually emptied from the rear when the book or document is complete. The various sheets to be collated are fed in reverse order by a printer or duplicator (not shown), one sheet at a time or as signatures, onto a table 132, indicated in FIG. 1, at the front of the distributor from whence they are conveyed rearwardly by a pair of laterally spaced tapes 46—46 through a horizontal course, an upward right angle turn, an upward course, a reverse turn, and a downward course fronting a selected column of the receiver shelves. During their downward course the sheets are deflected onto respective of the shelves by a column of deflecting finger mechanisms 105 shown most clearly in FIGS. 5 and 6. These are sequentially triggered during each cycle by a tripping bar 61 which is cycled independently of the tapes 46 and progresses from one finger mechanism to the next responsive to passage of each deflected sheet through a vertical light beam in a control system. During their horizontal course, upward course and reverse turn in the distributor the conveyed sheets are held against the tapes 46 by rows of steel balls 92 whereas during their downward course fronting the receiver they are held by a series of elongated horizontal rollers 66. Pressure between the tapes and these rollers 66 is established by a gang of buggy units 96 shown in detail in FIGS. 8 and 9 whereas during their travel through the horizontal and upward courses the tapes 46 back against respective rows of rollers 89 and 90 seen in FIG. 6 which are carried by a pair of guide plates 76 in the horizontal course and by a pair of guide frames 85 in the upward course. These guide plates and frames, guide the longitudinal side edges of the conveyed sheets and are laterally adjustable. The guide frames 85 also carry the buggy units 96 and these in turn carry the deflecting fingers. Idler pulleys 129 for the tapes 46 and retaining means for the balls 92 are also mounted on the guide plates and frames, 76, 85. Accordingly lateral adjustment of the guide plates and frames automatically adjusts the lateral spacing between the pairs of conveying tapes 46, idler pulleys 129, rollers 89 and 90, balls 92, buggy units 96, and deflecting finger mechanisms 105.

Figure 16:
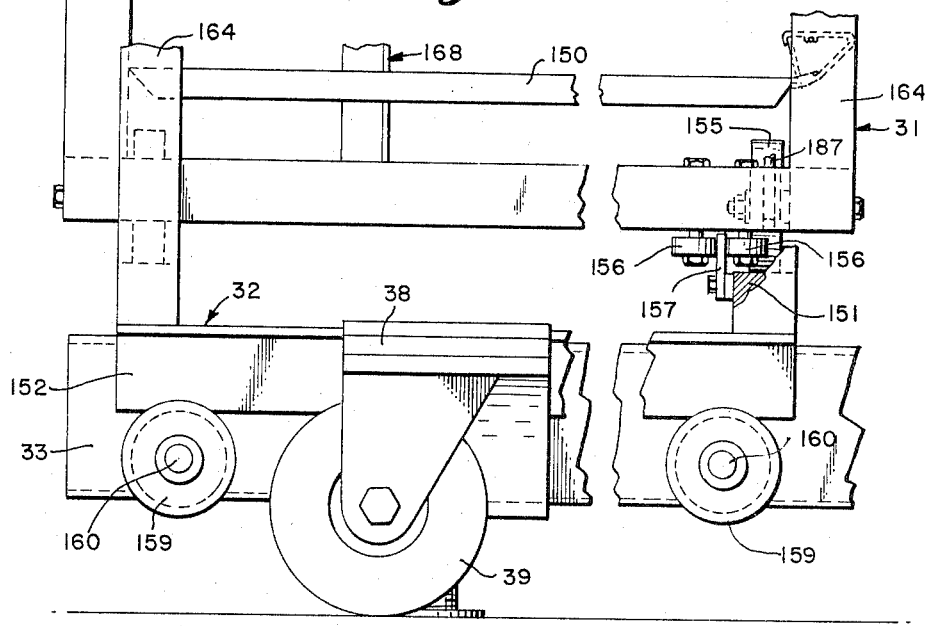
FIG. 16 is a fragmentary side elevational view taken on line 16—16 of FIG. 2.
Figure 17:
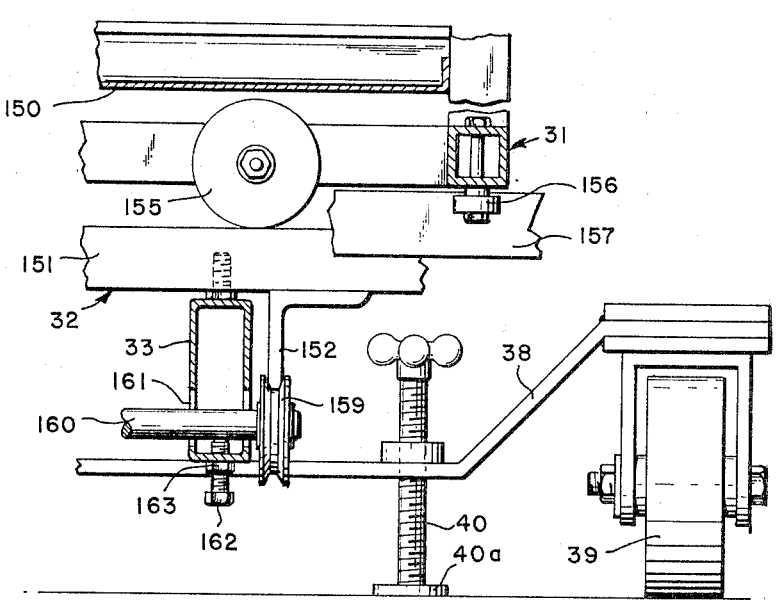
FIG. 17 is a transverse cross-sectional view taken on line 17—17 of FIG. 16.

Continuing to a detailed description of the parts of the collator, and referring particularly to FIGS. 16–17, the distributod 30 has a base frame which presents a pair of rearwardly extending rails 33 having an outrigger 38. At the free ends of this outrigger are mounted a pair of swivel caster wheels 39 and at the front the distributor frame has a pair of unidirectional wheels 37. Also mounted on the outrigger 38 are a pair of screw-jacks 40 with base pads 40a for leveling and braking the distributor.

The carriage 32 has a laterally spaced pair of fore-and-aft angle bars 152 on its underside joined by a laterally extending pair of rails 151. These angle bars 152 track at the outer sides of the rails 33 on circumferentially grooved rollers 159 which are journaled on dead shafts 160 whereas rollers 155 mounted at the lower corners of the receiver 31 track on the rails 151. With this arrangement the receiver can be shifted laterally relative to the distributor on the carriage 32, and also can be moved rearwardly from the discharge face of the distributor by movement of the carriage on the rollers 159. The first of these movements is used to alternate the column of shelves in the receiver which registers with the distributor discharge, while the other movement permits easy access to the back discharge face of the distributor for servicing. At the same time, the described arrangement permits ease of placement and removal of the receiver from the carriage with the rollers 155 remaining with the receiver to serve as ground support wheels. Hand rails 164 are conveniently located at the lateral sides of the carriage.

Accidental fore-and-aft shifting of the receiver relative to the carriage is prevented by two pairs of keeper rollers 156 shown in FIG. 16 which depend from the base of the receiver to straddle an upstanding retainer bar 157 which is bolted to the aft face of the front carriage rail 151. The receiver is locked against movement laterally of the distributor by a vertical slide bolt 187 which is mounted near one of the front corners of the receiver and selectively registers with a series of holes in the front carriage rail 151. Each of these holes is arranged such that a respective column of the receiver the carriage on the rollers 159, and hence does not effect the distributor when the bolt 187 is received therein. This does not interfere with fore-and-aft adjustment of the carirage on the rollers 159, and hence does not effect adjustment of the spacing of the receiver behind the distributor. For this adjustment the rails 33 have rearwardly directed stop bolts 183 shown in FIG. 6 against which the front of the carriage is pulled by manual operation of an over-center toggle lever 184 details of which are shown in FIG. 24. This lever is swingably mounted intermediate its ends on the underside of the distributor to be accessible at one side thereof, and is pivotally connected at its other end to a pull rod 185 which is in turn connected by a tension spring 186 to the front of the carriage. In order to vertically adjust the receiver relative to the distributor for proper indexing, the shafts 160 for the rollers 159 are mounted in vertical slots 161 (FIG. 17) in the rails 33 and are engaged by upstanding adjusting screws 162 each provided with a lock nut 163.

Figure 6:
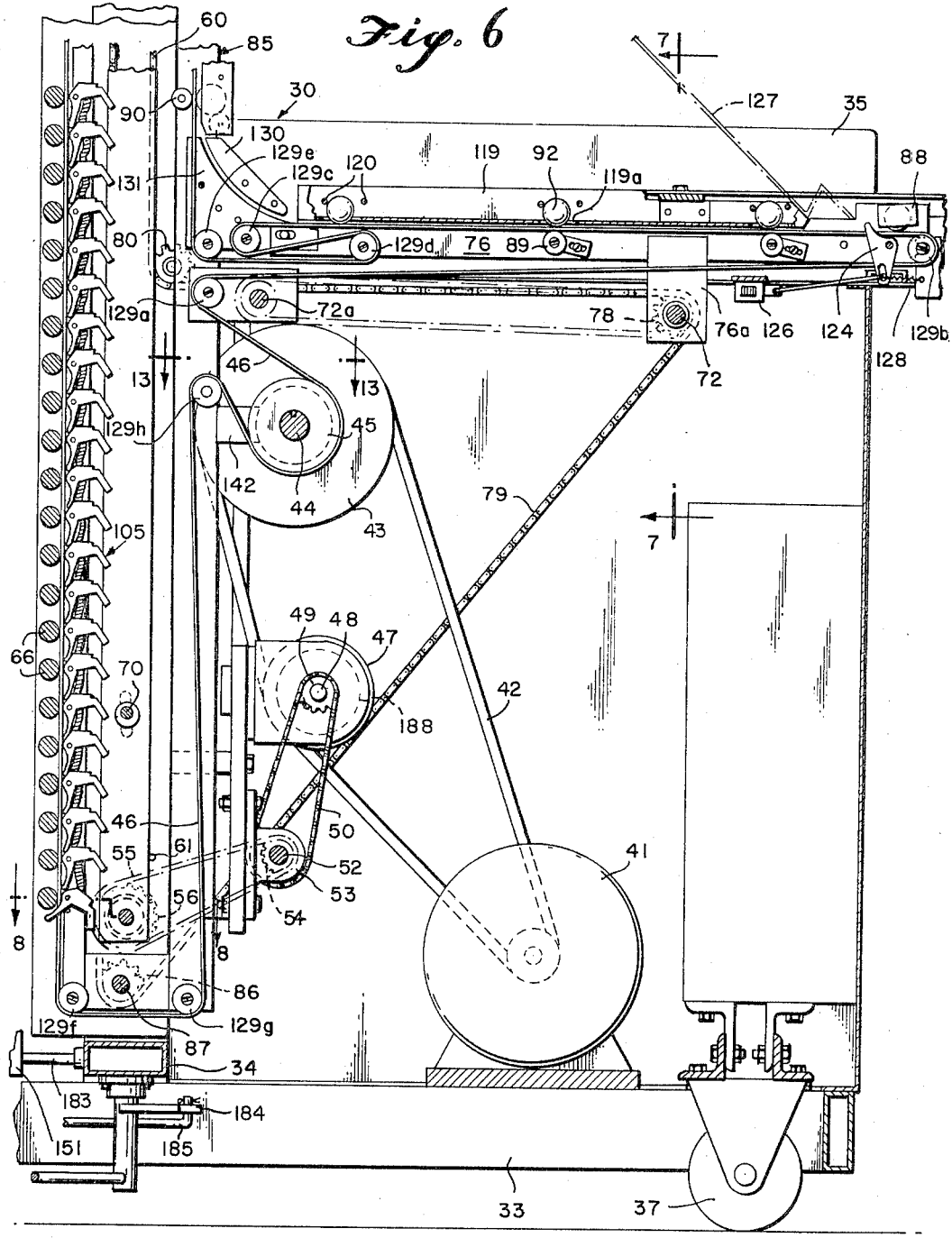
FIG. 6 is a vertical cross-sectional view on an enlarged scale taken on line 6—6 of FIG. 2.

The distributor has a front housing 35 with a side access door 36 and is surmounted at the rear by a vertical housing 34. Within the front housing there is mounted a motor 41 which, as shown in FIG. 6, drives sheaves 43 and 47 via a belt 42. The first of these sheaves is fixed on a shaft 44 having a pair of crown pulleys 45 slidably mounted thereon and driving the conveying tapes 46. As shown in FIGS. 6 and 13, the pulleys 45 each have a circumferentially grooved extension 45a which interfits with a respective shift arm on the front member 85a of the respective guide frame 85 so that the distance between the pulleys 45 will automatically be adjusted in accordance with adjustment of the spacing between the guide plates 76 and between the guide frames 85.

The tapes 46 travel upwardly and rearwardly from the pulleys 45 to an idler 129a and then forwardly to a pulley 129b located just to the rear of the table 132. For their front horizontal course the tapes travel rearwardly from the front pulley 129b to a pulley 129c and then they double back over an idler 129d to start their upward course over pulley 129e. At the top of their upward course the tapes pass over a pair of large crown sheaves 112, and progress through their downward course to pulley 129f. They then return to drive pulley 45 via pulleys 129g and 129h. All of the pulleys 129a through 129h are crown pulleys to retain the tapes 46 thereon.

The other drive sheave 47 selectively drives a shaft 48 through an electrically operated clutch-brake 188 which either couples the sheave 47 to the shaft 48, or idles the sheave 47 and brakes the shaft 48 relative to the distributor frame. Power is transferred from the shaft 48 to a shaft 57 in two speed-reduction stages, the first stage comprising a sprocket 49, chain 50, and sprocket 51 on an intermediate shaft 52 mounted in a bearing block 53 fixed to the distributor frame. The second stage comprises a second sprocket 54 on the shaft 52, a chain 55, and a sprocket 56 on the shaft 57.

Figure 5:
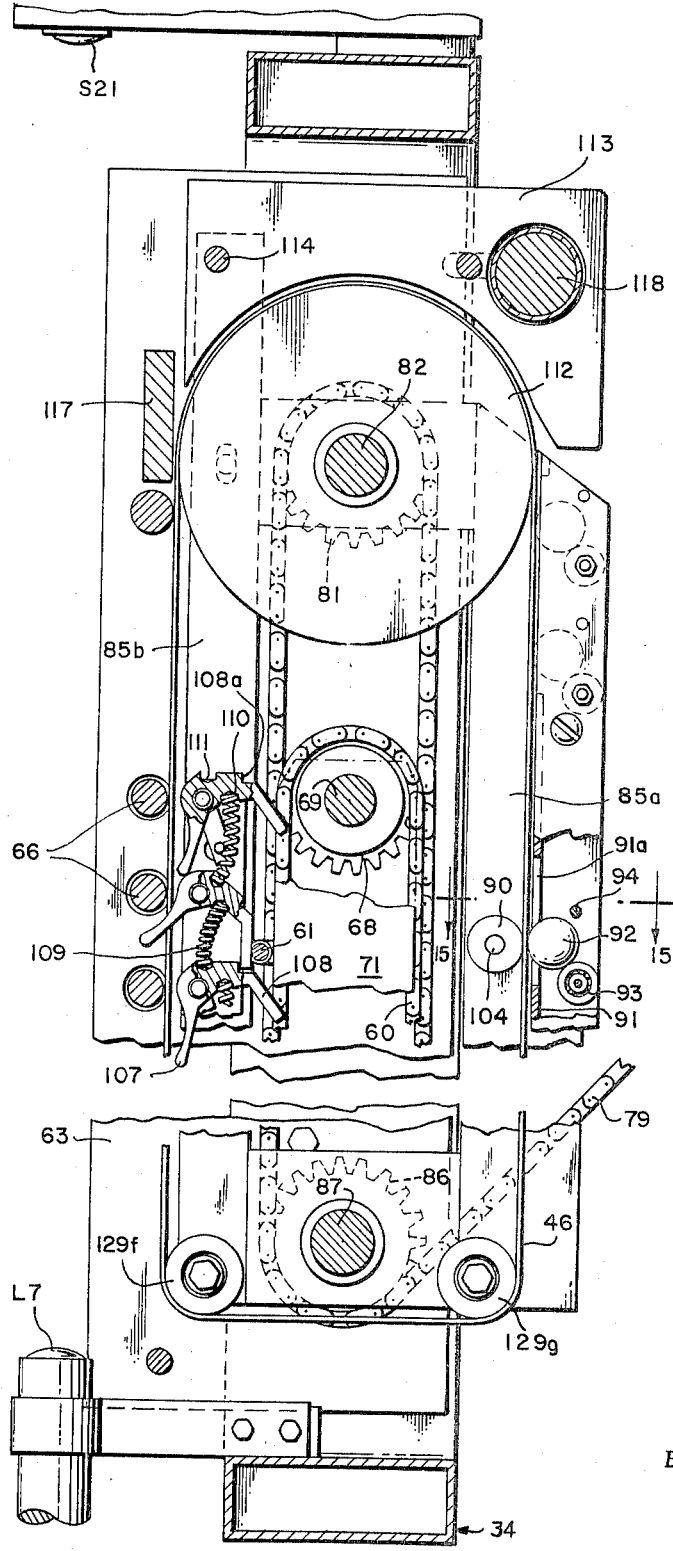
FIG. 5 is a vertical sectional view to an enlarged scale and taken on line 5—5 of FIG. 2.

Referring now to FIG. 8, it is seen that the ends of shaft 57 are journaled to bearings 58 which are mounted in vertical side plates 63 running substantially the heighth of the vertical housing 34 and fixed thereto. Positioned next to the sprocket 56 is a small sprocket 59 which has a counterpart pinned near the other end of the shaft 57. Carried on these sprockets 59 are endless chains 60 whose main purpose is to carry the tripping bars 61 in a respective continuous cycle vertically within the frame 34, the bars being attached to the chains at diametrically opposite points by appropriate clips 62. Spacers 64 are secured between the side plates 63, one at the top and one at the bottom, to insure proper alignment. At the rear or discharge end of the plates 63 a pair of registering columns of equally spaced holes are bored to accept pairs of alined bearings 65—65 for the rollers 66. These rollers are retained by respective end caps 67 which are screw attached in a manner allowing enough end play for free turning of the rollers while holding them in their bearings. The pair of chains 60 continues upwardly from beneath the sprockets 59 and, as seen in FIG. 5, passes over sprockets 68 journaled on a dead upper shaft 69 having its end mounted in the side plates 63.

Suspended from the upper shaft 69 and located on a lower rod 70, equidistant from the ends thereof, are a pair of vertical plates 71, the function of which is to act by their rear edges as guides for tripping bars 61. Each of these guide plates 71 has an adjusting means, detailed in FIGS. 11–12, comprising respective nuts 77 sleeved eccentrically on the shaft 69 and rod 70 and necked at 77a to fit within the guide plates. The necks of the upper eccentric nuts are pivotally attached in mating holes to the guide plates for suspending them whereas the buttom nuts fit within respective vertical slots 71a as shown in FIG. 11. With this arrangement, when the eccentric nuts 77 are turned on their shafts they tend to move the plates 71 either slightly upward and forward, or downward and backward, thus guiding the tripping bar correspondingly outward or inward. Set screws 77b for the nuts keep the adjustment.

Figure 7:
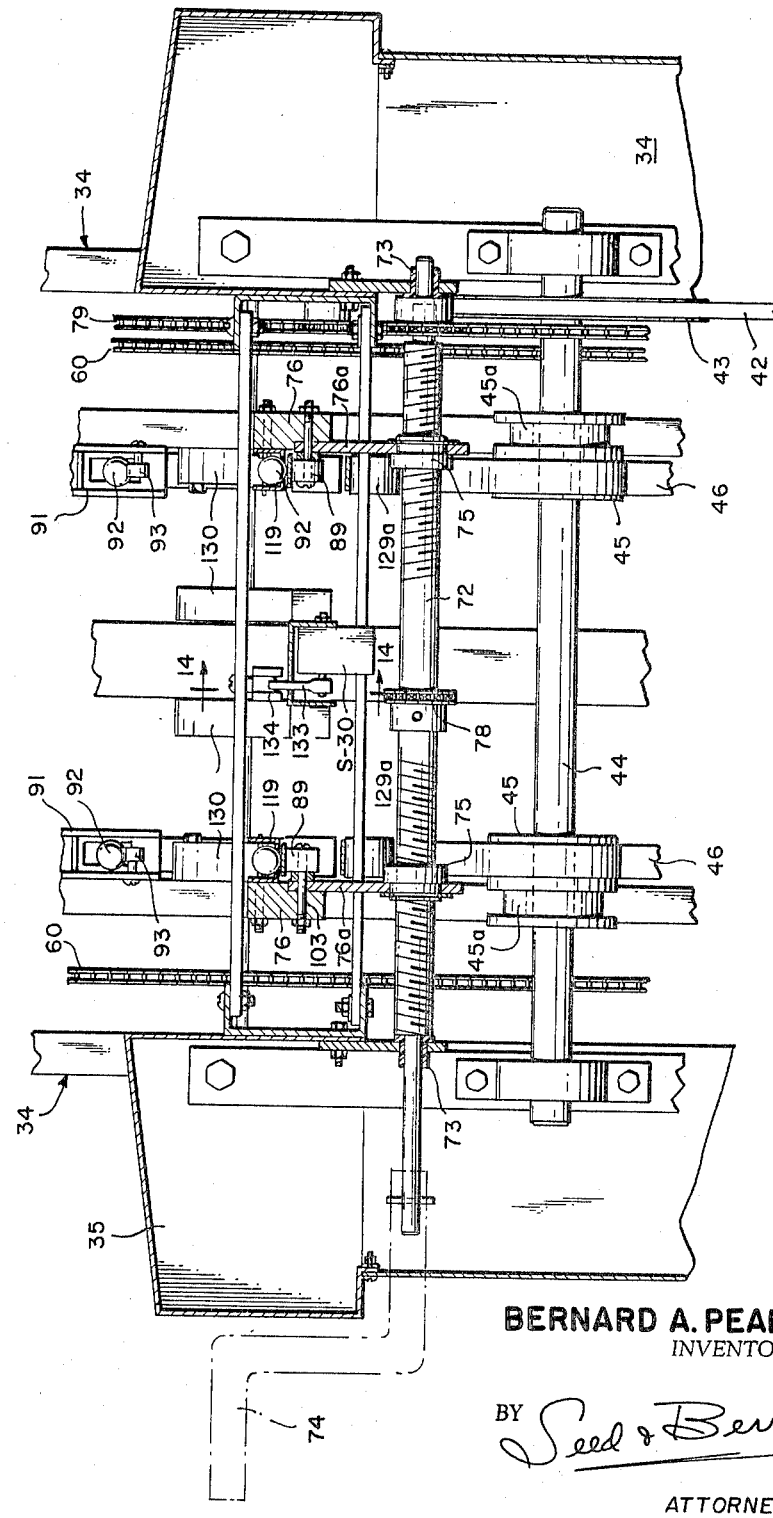
FIG. 7 is a transverse cross-sectional view taken on line 7—7 of FIG. 6.

As has been indicated the conveyed sheets are guided in their front horizontal course by guide plates 76 and in their upward course by guide frames 85 which are laterally adjustable for different widths of sheets to be collated. Directing attention to FIG. 7, it is seen that for this adjustment a transverse shaft 72 is journaled at 73—73 on the distributor housing 35 and can be manually turned from one end by a crank 74. Of importance is the fact that the shaft 72 is formed with threaded end sections having reversed threads which receive follower nuts 75—75. The latter are journaled in downward extensions 76a of the guide plates 76 and are retained in the extensions by integral collars on one end and snap rings on the other end. The shaft 72 is matched near the rear of the guide plates 76 by a shaft 72a likewise having a follower nut connection with the guide plates. The follower nuts on the front shaft 72 are initially set farther apart than those on the rear shaft 72a so that the guide plates 76 will be toed a few degrees toward the rear and thereby present a tapered entry throat for the sheets as they initially move into the conveying tapes 46. An endless chain 79 driven by a sprocket 78 on the shaft 72 drives a matching sprocket on the front shaft 72a so when the crank 74 is turned the guide plates 76 move together either towards the center line of the collator or outwardly, depending on the direction of rotation, and during this adjustment the present rearward toeing thereof of the guide plates is maintained.

This in and out adjustment of the guide plates 76 is also distributed by the chain 79 to the two laterally-spaced vertical guide frames 85—85 in the upright portion of the distributor. For this purpose, after its horizontal path between the shafts 72–72a, the chain 79 makes an upward right angle turn about an idler sprocket 80 and then passes upwardly and over a sprocket 81 fixed on a shaft 82 which is journaled in bearings 83 near the top of the distributor frame 34. This shaft 82 is similar to shafts 72-72a in that it has reversely threaded sections at its ends receiving follower nuts which carry the guide frames 85. Each of these frames depends from its follower nut in a box-frame fashion in that it has a forward and aft horizontally-spaced vertical members extending to the bottom of the distributor. It will be noted that the shaft 82 also has journal sleeves 84 for the upper tape pulley 112 which are free turning and held thereon by snap rings. The journals 84 are tied to the guide frames 85 to move laterally therewith during adjustment of the frames. Returning to the chain 79, after passing over the sprocket 81 it travels down and around a sprocket 86 and returns at a slope to the sprocket 78 on the shaft 72. The sprocket 86 is fixed on a shaft 87 which matches shaft 82 by reverse-threaded end sections having follower nuts threaded thereon and journaled in the lower end portion of the frames 85 in like manner as the follower nuts thereabove. Thus, turning of the crank 74 adjusts the guide plates and frames 76, 85 in unison. As previously indicated, this adjustment in turn automatically adjusts the drive pulleys 45, upper pulley 112 and the other pulleys 129a–129h for the conveying tapes 46, the balls 92, the rollers 89 and 90, the buggies 96 and the finger units 105, and the outer vanes at the turns.

It has been indicated that during their travel through the horizontal and upward courses the conveyed sheets are held against the conveying tapes 46 by steel balls 92 which are opposed by rollers 89 and 90. As can be seen in FIG. 6, the first pair of these balls are each horizontally confined by a cage 88 while the other balls in the horizontal course seat in slots 119a formed in the webs of a pair of horizontal channels 119–119 which overlie the tapes 46. Crosspins 120 bridging the channels 119 prevent the balls from riding out of the slots 119a.

Directing attention to FIGS. 5 and 15, the front depending member 85a of each frame 85 has the backing rollers 90 for the tapes 46 mounted on its outside face, and on its forward facing edge it has mounted a respective channel 91 formed with cutouts 91a in its web opposite the rollers 90. The side flanges of each channel face forwardly to support therebetween a plurality of ball bearing rollers 93 mounted slightly below respective of the rollers 90. It will be noted that the upward course of the tapes 46 passes between the channels 91 and the rollers 90 and that sets of the balls 92 seat between the rollers 90 and 93 and thus bear through the cutouts 91a against the tapes. To prevent the balls 92 from falling forward out of the channel 91, pins 94 have been placed between the channel flanges in such a manner that the distance between each pin 94 and a respective of the rollers 93 is less than the diameter of the balls. However, the location of the pins 94 and the length of the cutouts 91a are such that the balls 92 can be removed for cleaning by pressing them upward and rearward so that they can be lifted out above the pins 94.

As previously mentioned, during their downward course fronting the receiver 31 the conveying tapes 46 are pressed against elongated rollers 66 by buggy units 96. Referring to FIGS. 9 and 10 it can be seen that these buggy units are attached to the rear members 85b of the frames 85 by bolts 95. Each buggy includes a pair of rollers 97—97 journal-mounted on dead shafts 99a–99b between the flanges 98a of a generally U-shaped frame 98 having a narrowed web 98b at the rear. The respective bolt 95 passes loosely through enlarged openings 101 in the center of the flanges of the U-frame 98 and receives the lower end of a pair of parallel links 100—100 having their upper ends pivoted on the upper shaft 99a. A leaf spring 102, overlapping the edges of the flanges 98a by laterally projecting ears 103 formed at the ends of the spring wraps between the rollers and around the buggy mounting shaft 95 a half-turn. The spring force exerted via the ears 103 on the U-frame 98 urges the latter rearwardly by rearward swing of the links 100 about the bolt 95 until the bolt engages the forward edge of the openings 101. Before the U-frame 98 reaches this rearward limit the rollers 97 bear against the inner face of the related tape 46 and thereby force the downward course of the tape rearwardly against the horizontal rollers 66.

The shafts 99a–99b which secure the rollers 91 in position project beyond the U-frame 98 and each have one of the deflecting finger units 105 mounted thereon and separated by a spacer from the buggy. The lower spacer 106 is thicker than the upper 106a to make up for the thickness of the outer link 100. Suitable snap rings retain the deflecting fingers on their shaft and the buggy units 96 in the bolts 95. When in normal non-deflecting position the finger components 107 of the units 105 are directed downwardly and lie forwardly of the rear extremity of the buggy rollers 97. The rear face of each finger 107 is a curved surface depicting a partial circumference of a circle whose diameter is slightly larger than the diameter of the rollers 66. The other end of each finger unit 105 extends in a forward manner from the shaft 99a or 99b on which it is mounted and then slopes downwardly at about a 45 degree angle as a trigger 108 so that as each of the two tripping bars 61 makes its descent it will engage the trigger and rock the finger unit such as to deflect the finger 107 upwardly into a sloping position spaced by a gap beneath a related of the rollers 66 as shown in FIG. 5. This rocking movement is yieldingly opposed by springs 109 mounted between the finger units. Each such spring has its upper end fitting into a bore 110 in the under side of the upper related unit and its lower end seating in a bore 111 in the top of the lower related finger unit. Both of these bore seats 110–111 are forwardly of the rocking axes of the finger units so that the springs 109 are compressed responsive to the action of each tripping bar 61 and return the respective finger units to their normal non-deflecting position as soon as the bar passes. It will be noted that each finger unit 105 has a forwardly facing shoulder 108a at the front of its head above the root end of its trigger for engagement by the tip of the next overlying trigger when the latter is depressed by one of the tripping bars. This arrangement limits the rocking of the finger units to assure the proper gap for passage of deflected sheets between the rollers 66 and the fingers 107 when in deflecting position. Proper deflecting position of the tripping bars during their downward course is set and maintained by the back edges of the two guide plates 71. Forward rocking movement of each finger in returning to its non-deflecting position is limited by engagement of the finger with the head of the next underlying finger unit. The bottom fingers are permanently locked in deflecting position.

Figure 4:
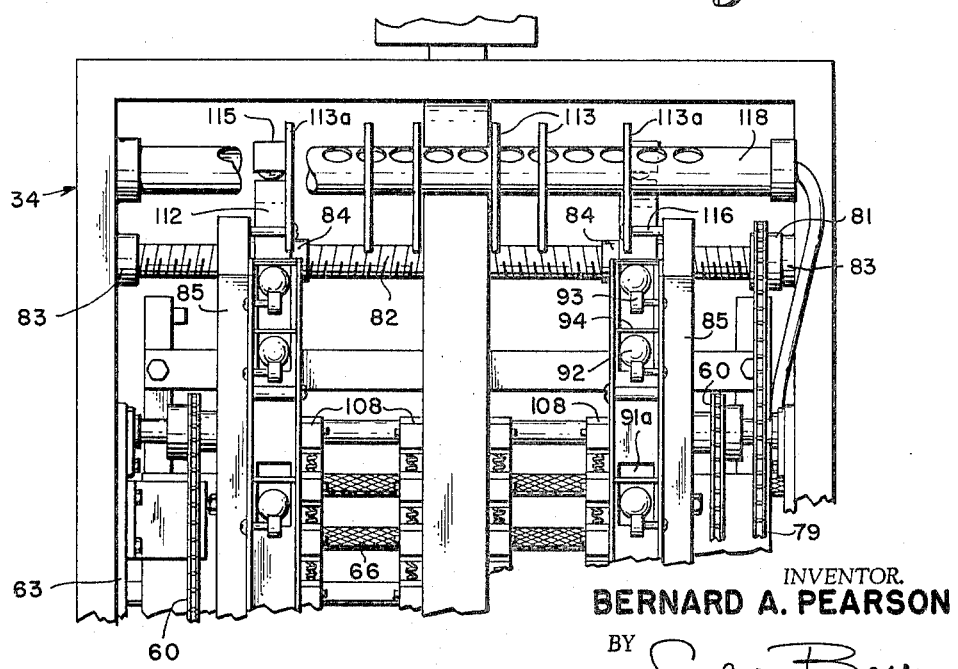
FIG. 4 is a front elevational view on an enlarged scale taken on line 4—4 of FIG. 1.

As has been indicated, between their upward course and their downward course the conveying tapes 46 pass over a pair of upper crown pulleys 112. Immediately above these upper pulleys are situated a lateral series of vanes 113 whose bottom edges describe a concave arc only slightly larger than the diameter of the pulleys. This provides a small gap between the vanes and the tapes 46 as they pass over the pulleys for passage of the conveyed sheets. The vanes 113 are mounted on two rods 114 which are anchored between the members 63, and the outermost 113a of the vanes carry the cages 115 for a pair of the balls 92 so that they will ride on the tapes 46 at the top of the upper pulleys 112. These outer vanes 113a are slidably mounted on the rods 114 and are coupled to the frames 85 at the top and rear thereof by bolts 116 (FIG. 4) to move in and out with the frames when they are adjusted for various widths of sheets to be collated. In this way the outer vanes and the ball cages 115 are kept in proper relation to the tapes 46. A strike plate 117 is mounted between the frames 63 at the head of the downward course of the tapes 46 in such a manner that a sheet traveling around the rolls 112 will hit the strike plate before being carried downward between the tapes and the uppermost of the rolls 66. It is advantageous for some sheet materials to have a high voltage anti-static generator 118 provided at the top of the distributor and this may extend through the vanes 113.

So that the conveyed sheets can properly navigate the ninety degree turn from the front horizontal course to the upward course of the tapes 46, upper vanes 130 with convex lower faces and lower vanes 131 with concave upper faces separated by a suitable gap and having concentric curvatures are mounted at the turn on rods 130a and 131a which are anchored to the distributor frame. Similarly to the vanes 131a, the outer of these vanes 130–131 may be slidably mounted on the respective rods and tied to the guide plates 76 to move therewith when the guide plates are adjusted.

When the sheets to be collated first enter the distributor they pass across a flat table 132 which is adjustable from horizontal to a decline. The sheets are guided by this table to enter upon the conveyor at a nearly flat attitude and are propelled to this point by the forward momentum imparted to them by the press or the related feeder. Before each sheet loses its forward momentum it passes between the conveying tapes 46 of the conveyor and the first of the steel balls 92. These balls press the sheet against the tapes to provide enough frictional drag as between the sheet and the tapes for conveyance of the sheet by the tapes. As each sheet is conveyed along the front horizontal course beneath succeeding of the balls 92 it is guided by gradual conveyance of the guide plates 76 and is tensioned by a gradual divergence of the tapes 46 as the distance from the entry increases. This tension prevents the sheet from acquiring slack and hanging up or creasing as it negotiates turns in the conveyed path. To provide this tape divergence during the front horizontal course the rear crown pulleys 129c are spaced apart further than the front pulleys 129b. Similarly, the pulleys 129e at the lower end of the upward course of the tapes 46 are closer together than the upper pulleys 112. To make the latter possible the idler pulleys 129d are made closer together than the pulleys 129c at the rear of the horizontal course, and the pulleys 129e are positioned still closer together. Thus the tapes 46 diverge in the horizontal course, converge between the horizontal course and the upward course, and diverge during the upward course. The steel balls 92 pressing the sheets against the conveyor provide enough force to maintain the tension supplied by divergence of the tapes and at the same time permit each sheet to change attitude on the conveyor and be straightened by the guiding effect of the plates 76 and members 85a. Furthermore, the balls 92 do not over-drag even if they become sticky from carryover of some of the printing press solutions. The backing rollers 89, 90 opposite the balls 92 in the horizontal and upward courses of the tapes 46 are journaled on bolts 103–104 passing, respectively, through the guide plates 76 and the front member 85a of the guide frames. Various thicknesses of washers 103a, 104a are used to space the rollers 89, 90 such that they follow the convergence of the tapes 46. During their downward course tension is kept on the conveyed sheets by the series of buggies 96 pressing against the tapes and thereby pressing the sheets against the rollers 66. It should be noted that throughout the travel of each sheet, from the moment it enters the conveyor until the moment the deflecting fingers 107 eject it from the rear, all conveying parts touching the sheet do so at an outer edge thereof, and such is true regardless of the adjustment of the guide plates and guide frames 85. Accordingly, rubbing or smearing of the fresh ink by contact of the working parts of the machine with a printed area on the sheet is prevented.

The first sheets fed to the distributor during each cycle thereof may be deflected upwardly into a sloped proofing tray 127 (FIG. 6) by means of front deflecting fingers 124 so that the operator can visually check the printing quality and alinement. These fingers 124 are rocked into deflecting position by action of a solenoid 126 working in opposition to a return spring 128 and controlled by a switch S–5. After proofing and de-energizing of the solenoid 126 so that the fingers 124 are again dropped below the level of the conveyed sheets, the succeeding sheets pass beneath the proofing tray and are counted by a counter C–31 pulsed by closing of a micro-switch S–30 having its finger 133 (FIG. 14) projecting upward into the travel path of the sheets immediately behind the deflecting fingers 124. To insure adequate pressure by the sheets against the finger 133 to operate the switch S–30, a hold-down leaf 134 is provided. The counter C–31 adds the number of sheets that have gone by the proofing tray on the conveyor and its cycle is preset by the operator in accordance with the number of books to be collated.

As indicated schematically in FIG. 24, a cam 195 with a pair of diametrically opposite lobes is fixed on the intermediate shaft 52 to operate a micro-switch S–26 controlling the clutch-brake 188. The teeth ratio of the sprocket 53 to the sprocket 56 is such that during a half revolution of the shaft 52 the tripping bars 61 progress one index i.e. move the increment between successive deflecting fingers 107. Accordingly, each time the tripping bars 61 move an index the shaft 48 is braked and the sheave 47 is uncoupled therefrom whereas the conveying tapes run continuously. Two tripping bars 61 are preferably provided so that when one has completed a cycle of traveling down the length of the column of deflecting fingers the other bar is approaching the top of the column thereby saving time between cycles. Each cycle is completed upon closing of a micro-switch S–25 (FIG. 25) by the respective tripping bar.

Directing attention to the receiver 31, the shelves 150 thereof are supported in a receiver frame 154 by nose pieces 165 at the front and by an integral lip 150a at the rear which is attached to the frame. The nose pieces 165 may be of extruded aluminum and are generally V-shaped in cross-section with the apex at the front and the two flanges, designated 165a and 165b, located, the first horizontally and the other sloping downwardly and rearwardly. A downturned lip 165c with about a ten degree forward slope from the vertical is formed at the back edge of the upper flange 165a, and intermediate its width the upper flange has a pair of bottom ribs defining a groove 165D therebetween. Directly below this groove the bottom flange 165b presents the front sloped shoulder 165e of a relatively wide rib 165f which terminates at a rear shoulder 165g spaced slightly forward of the lip 165c. A horizontal terminal lip 165h extends rearwardly of this shoulder 165g. The columns 154a at the front of the receiver frame each present vertically spaced pairs of roll pins 166 projecting in the transverse direction. Onto these pins are sprung the nose pieces 165 with one pin in each groove 165D and another in the V-groove formed by the front shoulder 165e and the upper face of the lower flange 165b.

At its forward end each shelf 150 has an upwardly offset horizontal portion 150b and an upturned terminal lip 150c which is bent at an acute angle with the shelf proper. The shelf is installed by tilting up its rear end slightly and introducing the upper edge of the front lip 150c in front of the downturned nose lip 165c. Then the shelf is lowered to the horizontal to seat the offset portion 150b on the lower lip 165h. Installation is completed by screw fixing the rear lip 150c of the shelf to the rear vertical members 154b of the receiver frame.

The bottom lips 165h of the nose pieces are vertically spaced from the subjacent upper flanges 165a by narrow gaps 198 for entry of the sheets deflected from the distributor. As shown in FIG. 23 each of these gaps is so located with respect to one of the distributor rollers 66 as to receive a sheet from the underside of the roller when the sheet is deflected by the subjacent finger 107 and is guided by the underside of the downwardly sloping flange 165b.

It will be noted that the front offset portion 150b of each shelf has the effect of locating the bottom face of the shelf at the same level as the bottom face of the related lip 165h. Also, it will be noted that each shelf is formed with a transverse row of downwardly dished dimples 150d located adjacent the offset portion 150b and each having a depth exceeding the entry gap 198 between nose pieces. The back portion of the dimples in each shelf combine with the sloped back faces of the adjoining depending nose lip 165c and front shelf lip 150c to deflect the forward portion of each sheet downwardly if, after entering through the gap 198, it bounces upwardly as well as forwardly from a rear adjustable stop bar 168 which limits rearward travel of the sheets after they have entered the receiver.

Such a stop bar 168 is provided for each column of shelves in the receiver and passes through V-shaped slots 167 formed in the shelves to permit easy access to the front of the shelf from the rear for removing shorter sheets that may be collated. Each stop bar is of channel section and at its ends has its flanges 168a cut back leaving web extensions 168b top and bottom. Bolted at 169 to these web extensions are magnets 170 to give ease and speed of removal and installation of the bar to and from a pair of angle brackets 171. Each of these brackets has an extension bolt 172 threaded therein and set by a nut 173 for receiving a compression spring 175 seated against its head and against a washer 174. The bolts 172 ride in respective fore-and-aft slots 176 in the top and bottom walls of the receiver with the springs 175 urging the brackets 171 thereagainst. Along the longitudinal sides of the slots are rows of index holes 177 for selectively receiving dowel pins 178 which project vertically from the brackets to position them. Adjustment of each bracket for various lengths of collated sheets can be easily made by pressing its bolt 172 endwise to compress the related spring 175 sufficiently to unseat its dowel pins 178 from the then occupied index holes 177. Then the bracket can be slit along the respective slot 176 and released when its dowel pins are at the desired index points.

Provision is made for adjustment of the effective width of each cubicle in the receiver, and namely by a laterally spaced pair of cheek plates 135 for each shelf 150. The cheek plates at each side of each column of shelves are journaled on a respective pair of vertical rods 136 which pass through a pair of arcuate slots 150d–150e in each of the shelves. The rods 136 are swung by matching parallel linkages located at the top and bottom of the receiver. Each linkage comprises a pair of parallel links 137 each having one of its ends swingably mounted at 138 on the receiver housing and its other end sleeved on the related rod 136. To move the opposing cheek plates 135 back and forth in unison the rods 136 at each side of the column are connected beneath the bottom shelf by respective of a pair of parallel follower bars 139 which are sleeved on the rods. These are in turn interconnected by an elongated transverse adjusting screw 140 with reversed threads for its follower bars. One end of the adjusting screw is exposed and has a handle 141 for manual turning thereof to adjust the distance between the cheek plates 135 at will.

Mounted on the bottom of the distributor frame is an infra-red light source L–7 directed so that its beam passes upwardly through the gap between the back of the distributor and the front of the receiver in laterally centered relation with respect to the downward course of the conveying tapes 46. An infra-red light sensitive switch S–21 is mounted on the upper part of the distributor frame 34 directly above the light source L–7. During discharge of each sheet from the distributor by action of the deflecting fingers 107 when rocked by one of the tripping bars 61, the sheet interrupts the light beam, and hence breaks the switch S–21, until the sheet has passed into the receiver. The significance of this action will appear from the following explanation of the control circuit (FIG. 25) for the collator.

The electrical control system for the collator includes three key relays R–11, R–12 and R–13 whose operation is basically controlled by light cell switch S–21 and by the cam operated switch S–26. The latter is in the illustrated position whenever the lobes on the cam 195 engage the leaf of the micro-switch S–26, and namely, whenever the tripping bars 61 have moved one increment or index. While the coil of relay R–13 is deenergized, as illustrated in FIG. 25, the brake is set and the clutch is disengaged. Conversely, each time the coil of relay R–13 is energized the brake is released and the clutch is engaged to advance the tripping bars 61. As will now be explained, this cannot occur until the light cell switch S–21 has been opened due to interruption of the light beam thereto by passage of a sheet from the distributor to the receiver. As indicated in FIG. 25, the clutch-brake 47 has a D.C. power source, namely, rectifier 47a. The light L–7 and the motor 41 are turned on by depressing switch S–3 which closes the circuit to the coil of relay R–16 thereby electrically locking in this relay. The relay contacts R–16(2) complete the power circuit for the light, and the other relay contacts R–16(1) close one of the power leads for the motor. When the switch S–3 is rocked back to its normal position the other power lead for the motor is closed and the motor starts. In the meantime the light L–7 has had a chance to obtain its full brightness so that the light cell switch S–21 is latched into condition before the motor starts. This arrangement prevents premature energizing of the clutch and release of the brake.

It will be noted that there are two alternate circuits by which the coil of relay R–13 can be energized, and both include different contacts of the cycle micro-switch S–26. In the position of this switch illustrated in FIG. 23, wherein one of the lobes of the cam 195 engages the leaf of the switch, the power circuit for the coil of R–13 includes the contacts R–11(1) of the relay R–11 and the contacts R–12(2) of relay R–12. Hence, when one of the tripping bars is located at finger deflecting position, both relays R–11 and R–12 must have their coils energized in order for the clutch to become engaged and the brake released to continue the cycle. The coil of relay R–11 depends on closing of the light cell switch S–21, for power, whereas the coil of relay R–12 depends for power upon the contacts R–11(2) being closed before relay R–12 can lock in by way of the closing of its contacts R–12(1). In no case can the coil of relay R–12 be energized when the flats of the cam 195 engage the leaf of the cycle switch S–26 permitting the latter to rock from the illustrated position to one in which the coil of relay R–13 is energized regardless of the state of relays R–11 and R–12. In other words, when both tripping bars are out of finger deflection position, relay R–13 is always closed to keep the clutch engaged, and relay R–12 is always open.

Howbeit, since before lock-in of relay R–12 can occur, relay contacts R–11(2) must be closed, and the latter requires that relay R–11 be open by way of light cell switch S–21 being turned off, the light beam between the distributor and receiver must be interrupted by a discharging sheet after one of the tripping bars has tripped a deflecting finger before the clutch can possibly again engage by closing of relay R–13 for further advancing the tripping bars. Thus at the start of each increment or index point in the distributor cycle, the three relays R–11, R–12 and R–13 are closed, and then as soon as the respective lobe of the cam 195 advances away from the leaf of the micro-switch S–26 the relay R–12 opens. At the same time the coil of relay R–13 has its alternate power circuit closed. This alternate power circuit is opened to disengage the clutch responsive to the advancement of the other lobe of the cam to the switch S–26. Simultaneously the next deflecting finger has been rocked by a corresponding advance of the tripping bar, and as soon as a sheet is discharged over this finger into the respective shelf of the receiver and has thereby interrupted the light beam, resulting in opening of the switch S–21, deenergizing of the relay R–11, closing of contacts R–11(2), energizing of the coil of relay R–12, and lock-in of the latter, the cycle can automatically continue.

A time delay unit T–52 may be provided having its charging and reset circuits passing through the contacts R–11(3) of the relay R–11 such that each time the latter is de-energized responsive to opening of the light cell switch S–21 the time delay unit is charged. If the charging time is longer than the preset time the time delay unit completes the power circuit for the coil of relay R–14. This opens the power circuit to relay R–16 and as a result stops the motor 41. Thus if the light beam is interrupted for more than the presetting of the time delay unit T–52, a third of a second, for example, because a sheet should fail to pass from the distributor to the intended shelf in the receiver, the collator automatically shuts down until continued the tripping bar remains at the same finger station until the shorted shelf is supplied.

Before feeding the collator with sheets the operator manually sets the counter C–31 to the desired number of books or documents to be collected in any one column of receiver shelves. As the sheets to be collated are fed to the distributor and start rearwardly along their initial course they successively close the normally open count switch S–30 and cause power to be supplied to the counting coil C–31(1) of counter C–31. This counter does not register a count increment until the respective sheet has completely passed the count switch S–30 thereby opening the counter circuit. In other words the count is registered during the spring return stroke of the counter. When the preset count is reached the counter contacts C–31(3) and (4) move to the dotted positions wherein the first of these contacts completes a power circuit for the coil of a timer relay R–15 while the other has this office for a proofing relay R–42. The latter is locked in via a proofing switch S–5 and this locking circuit also energizes the proofing solenoid S–35 to rock the proofing fingers 124 into sheet deflecting position.

Relay R–15 has three sets of contacts, the first of which, designated R–15(1) completes a lock-in circuit via a closed micro-switch S–25 which is arranged to be triggered open by the tripping bars 61 after a period of travel from the bottom set of deflecting fingers. The second set of contacts R–15(2) closes the power circuit for an electric timer T–32 functioning to sequentially close two switches T–32(1) and (2). When closed, the first of these timer switches completes the power circuit for the reset coil C–31(22) of the counter to turn it back, and the second timer switch completes a power circuit to the coil of the relay R–13 to engage the clutch and start another cycle. Finally, the third set of contacts R–15(3) completes a power circuit to the coil of a cycle interrupt relay R–45. This relay is slower in operation than the relay R–42 and so the latter has time to energize and lock in via the proofing switch S–5 before the relay R–45 opens its contacts and thereby breaks the initiating power circuit for the coil of relay R–42 from the counter contacts C–31(4). After the switch T–32(2) has closed causing the clutch to engage, the tripping bar which just completed its cycle, travels a short distance and opens the switch S–25 thereby opening the lock-in circuit for the relay R–15 whereupon the control circuit is ready for another cycle. If desired, the relay R–15 can be energized manually by switch S–28 to recycle the machine and the counter C–31 can be manually reset by switch S–29.

At the start of a new cycle the relay R–42 and proofing solenoid S–35 are still energized and hence the first new sheets fed to the distributor will be automatically deflected by the fingers 124 upwardly onto the proofing tray. When proofing is completed the operator presses the proofing switch S–5 which opens the lock-in circuit for the relay R–42 and deenergizes the proofing solenoid.

When desired an extra sheet can be delivered to any selected shelf of the receiver by pressing the switch S–1 and the light L–8 blinks when delivery is made. Switch S–2 makes it possible to progress the tripping bars 61 at will one index per press of the switch to the level of a selected shelf. When desired the operating cycle can be interrupted by use of the switch S–6, and switch S–4 is used to turn off the machine.

The feeder for supplying the collator can have a vacuum control valve which is operated automatically, responsive to completion of a cycle of the distributor, by use of the feed switch S–40 and relay R–17. When this feed switch is in closed position the coil of the relay R–17 is energized upon closing of the contact C–31(4) by the reaching of the preset count. The relay then locks in by its contacts R–17(1) and its other contacts R–17(2) complete a circuit to the control valve via the contacts R–16(2) of the relay R–16.

It is believed that the invention will have been clearly understood from the foregoing detailed description of my illustrated now preferred embodiment. Minor changes in the details of construction will suggest themselves and may be resorted to without departing from the spirit of the invention. I accordingly intend that no limitations be implied and that the hereto annexed claims be given a scope fully commensurate with the broadest interpretation to which the employed language fairly admits.

I claim:

1. In combination, a pair of laterally spaced endless conveyor tapes having gradually diverging generally horizontal travel courses and gradually diverging upward travel courses, said tapes being closer together at the lower ends of their upward travel courses than at the divergent ends of their horizontal travel courses, guide means for guiding said tapes in converging courses from the divergent ends of their horizontal courses to the lower ends of their upward travel courses, means for moving said tapes along said courses in the direction of divergence of the horizontal and upward travel courses, and means for holding a thin flexible sheet against said tapes to convey it and at the same time laterally tension it by said tape divergence.

2. In combination, a pair of laterally spaced endless conveyor tapes having generally diverging generally horizontal travel courses joining gradually diverging upward travel courses, a first pair of sheet guides on the outside of said horizontal travel courses and gradually converging in the direction of divergence of said horizontal travel courses, a second pair of sheet guides on the outside of said upward travel courses and substantially parallel to one another, means backing the underside of said tapes in their horizontal courses and backing the back side of said tapes in their upward courses, balls freely rolling against said tapes in both said horizontal and upward courses, and retainer means for said balls.

3. The combination of claim 2 in which means are provided for moving said first and second pairs of guides in unison to adjust for various widths of sheets to be conveyed.

4. In combination, a frame member, a series of regularly spaced buggy means carried by said frame member and each providing a pair of spring-urged parallel buggy rollers, a series of deflecting fingers carried by said buggy means for rocking in the same general direction that said rollers are spring urged, and a series of spring means between said deflecting fingers for yieldingly resisting rocking thereof.

5. In combination with the structure of claim 4, tripping means for rocking said deflecting fingers in said general direction in opposition to said springs, and means for moving said tripping means means successively along said series of deflecting fingers.

6. In combination with the structure of claim 4, triggers presented by said deflecting fingers and extending oppositely from said general direction, and tripping means for successively engaging said triggers and thereby rocking said deflecting fingers in opposition to said springs.

7. In combination, a receiver with an upright column of shelves, a pair of upright frames, a respective vertically arranged plurality of buggy means carried by each said frame, each buggy means providing a pair of rollers spring-urged toward said receiver, a pair of endless conveyor tapes having laterally spaced downward courses having the rollers of said buggy means bearing thereagainst, means for moving said tapes in unison downward along said courses, a respective vertically arranged plurality of deflecting fingers carried by each said buggy means for individually rocking from a downwardly directed position to a deflected position directed toward a respective one of said shelves, springs between said deflecting fingers for yieldingly resisting rocking thereof, triggers presented by said deflecting fingers and extending away from said receiver, and tripping means for successively engaging said triggers and thereby rocking said deflecting fingers in opposition to said springs.

8. The structure of claim 7 in which the rollers of said buggy means are opposed by a vertically arranged plurality of horizontal backing rollers located between said frames and said receiver, said deflecting fingers each having a concave upper face cooperating when deflected with the underside of a respective opposed backing roller for deflecting and aiming a sheet toward a respective one of said shelves.

9. In combination, a distributor adapted to receive sheets to be collated at the front and to distribute them at the rear, one at a time, a successive vertically spaced levels, a carriage slidably mounted on the rear of said distributor for fore-and-aft adjustment relative to the distributor, and a receiver having side-by-side columns of shelves with the shelves in each column being arranged to successively receive sheets from said distributor when the column registers with the distributor, said receiver being slidably mounted on said carriage for lateral movement relative to said distributor to selectively bring said columns into registration with said distributor.

10. In combination with the structure of claim 9, lock means for selectively locking said receiver relative to said carriage when each of said columns registers with said distributor, adjustable stop means for limiting forward movement of said carriage relative to said distributor, and means for holding said carriage against said stop means.

11. In combination, a distributor having a frame and adapted to receive at a given level at the front of said frame sheets to be collated, endless sheet conveying means adapted to carry received sheets from said given level rearwardly on a first course, then in a second course to a level above said given level, and then in a back downward course, a first pair of laterally spaced sheet guide means on opposite sides of said conveyor means along said first course, a second pair of laterally spaced sheet guide means on opposite sides of said conveyor means along said second course, guide adjusting means on said distributor frame for carrying said first and second pairs of guide means and for adjusting their distance apart in unison, means on said first and second pairs of guide means for carrying said conveying means during its said first, second and downward courses, adjustable drive means on said distributor frame for driving said conveying means, means for shifting said drive means relative to said frame in unison with adjustment of said first and second pairs of drive means, a column of deflecting means swingably carried by said second pair of guide means for successively rearwardly deflecting conveyed sheets from said conveying means at progressively lower levels along said downward course responsive to successive rocking of said deflecting means, tripping means on said distributor frame for successively rocking said deflecting means, and a receiver presenting a column of shelves spaced rearwardly from said downward course and arranged to successively receive the deflected sheets.

12. The combination of claim 11 in which said guide adjusting means comprises a respective pair of parallel laterally extending shafts for each of said pairs of guide means journal mounted on said distributor frame with each said shaft having oppositely threaded screw portions threadably received, one by one guide means of the respective pair and the other by the other guide means of the respective pair, and means for selectively turning said shafts in unison in either direction of rotation.

13. The combination of claim 11 in which said sheet conveying means comprises a pair of laterally spaced conveyor tapes riding on parallel idler pulleys journal mounted respectively on said first and second pairs of sheet guide means whereby the distance between said tapes is adjusted along with adjustment of said sheet guide means by said guide adjusting means.

14. The combination of claim 13 in which said adjustable drive means comprises a drive shaft journaled on said distributor frame in parallel relation to said idler pulleys, and a pair of pulley wheels for said conveyor tapes driven by said drive shaft and slidable therealong in unison with movement of said idler pulleys responsive to operation of said guide adjusting means.

15. In combination; a distributor adapted to receive sheets to be collated at the front and to distribute them at the rear at predetermined vertically spaced levels, a receiver having side-by-side columns of shelves with the shelves in each column being arranged to receive sheets from said distributor when the column registers with the distributor, supporting base means for said receiver positioned behind said distributor, means to shiftably mount said receiver on said base for lateral movement relative to said distributor to selectively bring said column into registration with said distributor, and means mounting said base relative to said distributor for spacing the registered column of the receiver a predetermined distance behind said distributor.

References Cited by the Examiner

UNITED STATES PATENTS

| | | | |
|---|---|---|---|
| 1,891,782 | 12/1932 | Sager | 271—75 |
| 2,076,391 | 4/1937 | Whitehead | 271—64 |
| 2,110,437 | 3/1938 | Couch | 271—75 X |
| 2,661,209 | 12/1953 | McGalliard | 270—58 |
| 3,026,107 | 3/1962 | Stroud | 270—58 |
| 3,108,796 | 10/1963 | Dietrick | 270—58 |

EUGENE R. CAPOZIO, Primary Examiner.

JEROME SCHNALL, Examiner.

R. E. KLEIN, N. M. ELLISON, Assistant Examiners.

UNITED STATES PATENT OFFICE
CERTIFICATE OF CORRECTION

Patent No. 3,273,882 September 20, 1966

Bernard A. Pearson

It is hereby certified that error appears in the above numbered patent requiring correction and that the said Letters Patent should read as corrected below.

Column 13, line 19, strike out "means", second occurrence; line 54, for "a", second occurrence, read -- at --.

Signed and sealed this 22nd day of August 1967.

(SEAL)
Attest:

ERNEST W. SWIDER
Attesting Officer

EDWARD J. BRENNER
Commissioner of Patents

PO-1050
(5/69)

UNITED STATES PATENT OFFICE
CERTIFICATE OF CORRECTION

Patent No. 3,273,882        Dated September 20, 1966

Inventor(s) Bernard A. Pearson

It is certified that error appears in the above-identified patent and that said Letters Patent are hereby corrected as shown below:

Column 1, line 52, for "elevation" read --elevational--. Column 3, line 7, for "distributod" read --distributor; strike out the entire line 45 and insert --shelves is properly aligned behind the discharge face of--; line 53, after "184" insert --the--. Column 4, line 46, for "end" read --ends--. Column 8, line 68, for "165D" read --165d--. Column 11, between lines 41 and 42 and after "until" of line 41 insert --the faulty sheet can be removed. When operation is then--.

SIGNED AND
SEALED
APR 28 1970

(SEAL)
Attest:

Edward M. Fletcher, Jr.
Attesting Officer

WILLIAM E. SCHUYLER, JR.
Commissioner of Patents